(12) United States Patent
Foral et al.

(10) Patent No.: US 11,781,575 B1
(45) Date of Patent: Oct. 10, 2023

(54) SPACER CLIP FOR USE IN A WALL ASSEMBLY

(71) Applicants: Joseph J. Foral, Blair, NE (US); Rene Barrera, Bennington, NE (US)

(72) Inventors: Joseph J. Foral, Blair, NE (US); Rene Barrera, Bennington, NE (US)

( * ) Notice: Subject to any disclaimer, the term of this patent is extended or adjusted under 35 U.S.C. 154(b) by 642 days.

(21) Appl. No.: 17/012,635

(22) Filed: Sep. 4, 2020

(51) Int. Cl.
*E04B 2/00* (2006.01)
*F16B 5/06* (2006.01)
*F16B 2/22* (2006.01)
*F16B 5/12* (2006.01)
*F16B 5/00* (2006.01)

(52) U.S. Cl.
CPC .............. *F16B 5/0692* (2013.01); *F16B 2/22* (2013.01); *F16B 5/0028* (2013.01); *F16B 5/121* (2013.01); *F16B 5/125* (2013.01)

(58) Field of Classification Search
CPC ........ F16B 5/0692; F16B 2/22; F16B 5/0028; F16B 5/121
See application file for complete search history.

(56) References Cited

U.S. PATENT DOCUMENTS

| 2,934,180 | A | * | 4/1960 | Hammitt | F16B 5/0028 D25/121 |
|---|---|---|---|---|---|
| 3,190,409 | A | * | 6/1965 | Helmer | B63B 3/142 114/88 |
| 3,738,083 | A | * | 6/1973 | Shimano | E04B 1/34315 52/584.1 |
| 4,110,948 | A | * | 9/1978 | Maier, Jr. | E04D 3/3608 52/489.1 |
| 4,296,524 | A | * | 10/1981 | Horholt | F16B 5/0607 D8/382 |
| 4,344,413 | A | * | 8/1982 | Watkins | F24S 20/66 126/633 |
| 4,361,993 | A | * | 12/1982 | Simpson | E04D 3/3607 52/273 |
| 4,682,454 | A | * | 7/1987 | Simpson | E04D 3/363 52/200 |
| 4,703,603 | A | * | 11/1987 | Hills | F16B 5/0028 52/582.1 |
| 5,517,731 | A | * | 5/1996 | Spykerman | F16B 5/0028 52/582.1 |
| 5,520,477 | A | * | 5/1996 | Fink | F16B 5/0028 403/231 |
| 10,612,574 | B1 | * | 4/2020 | Foral | F16B 2/245 |
| 2006/0174579 | A1 | * | 8/2006 | Matson | E04D 12/00 52/696 |
| 2009/0282768 | A1 | * | 11/2009 | Noturno | F16B 5/0028 52/582.1 |
| 2013/0174506 | A1 | * | 7/2013 | Bombino | E04B 1/7612 52/750 |
| 2016/0177559 | A1 | * | 6/2016 | Ohlsson | E04B 1/40 52/699 |
| 2018/0303230 | A1 | * | 10/2018 | Haas | F16B 2/24 |
| 2019/0211856 | A1 | * | 7/2019 | Getsiv | F16B 7/0473 |

* cited by examiner

*Primary Examiner* — Basil S Katcheves
(74) *Attorney, Agent, or Firm* — Suiter Swantz PC LLO

(57) ABSTRACT

A spacer clip comprised of a low thermal conductive material is secured to the Z girts of a wall assembly to provide a thermal break between the Z girts and the sheathing members of the wall assembly and to also provide a thermal break between the sheathing members and the insulation members of the wall assembly.

7 Claims, 9 Drawing Sheets

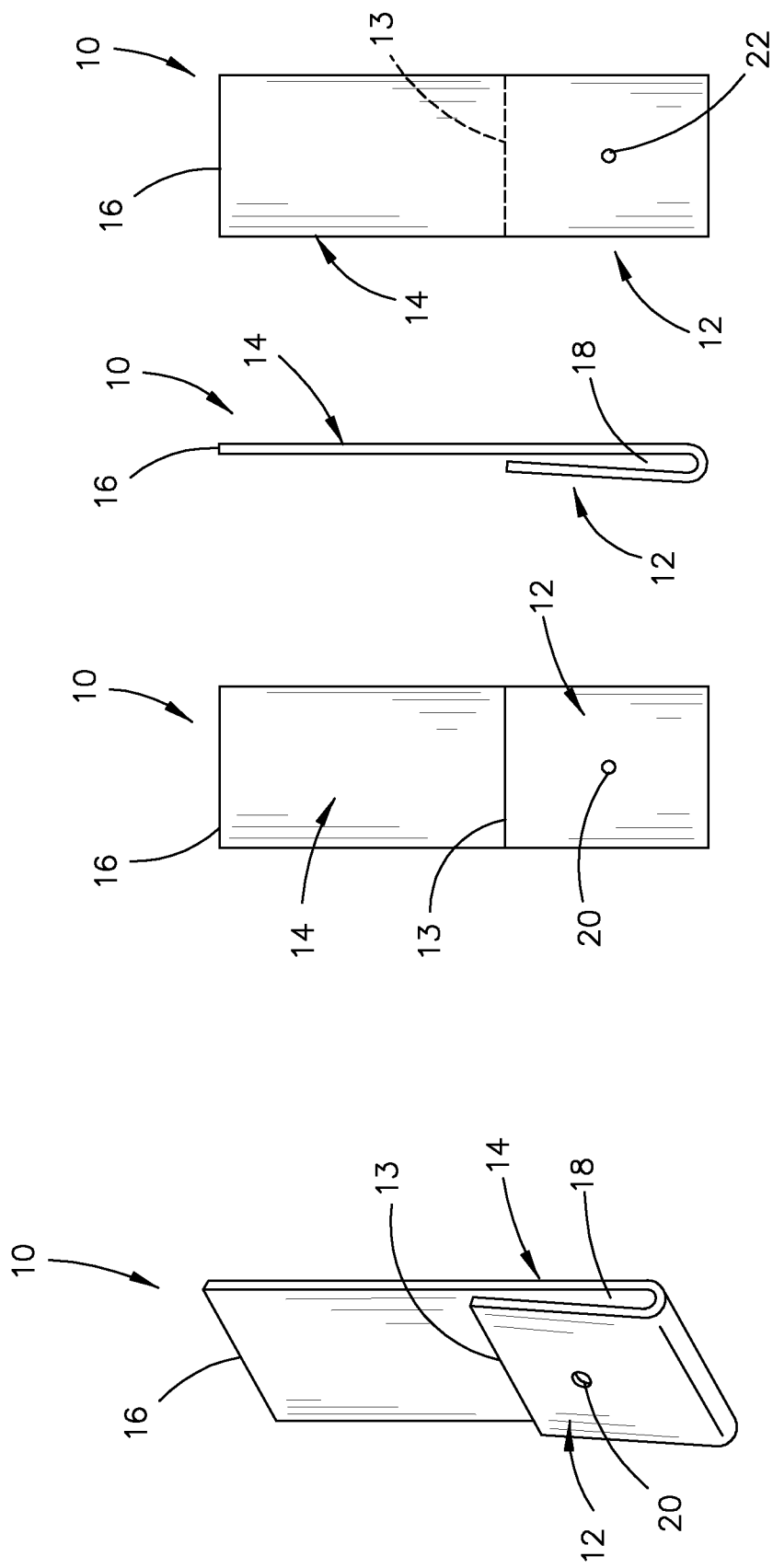

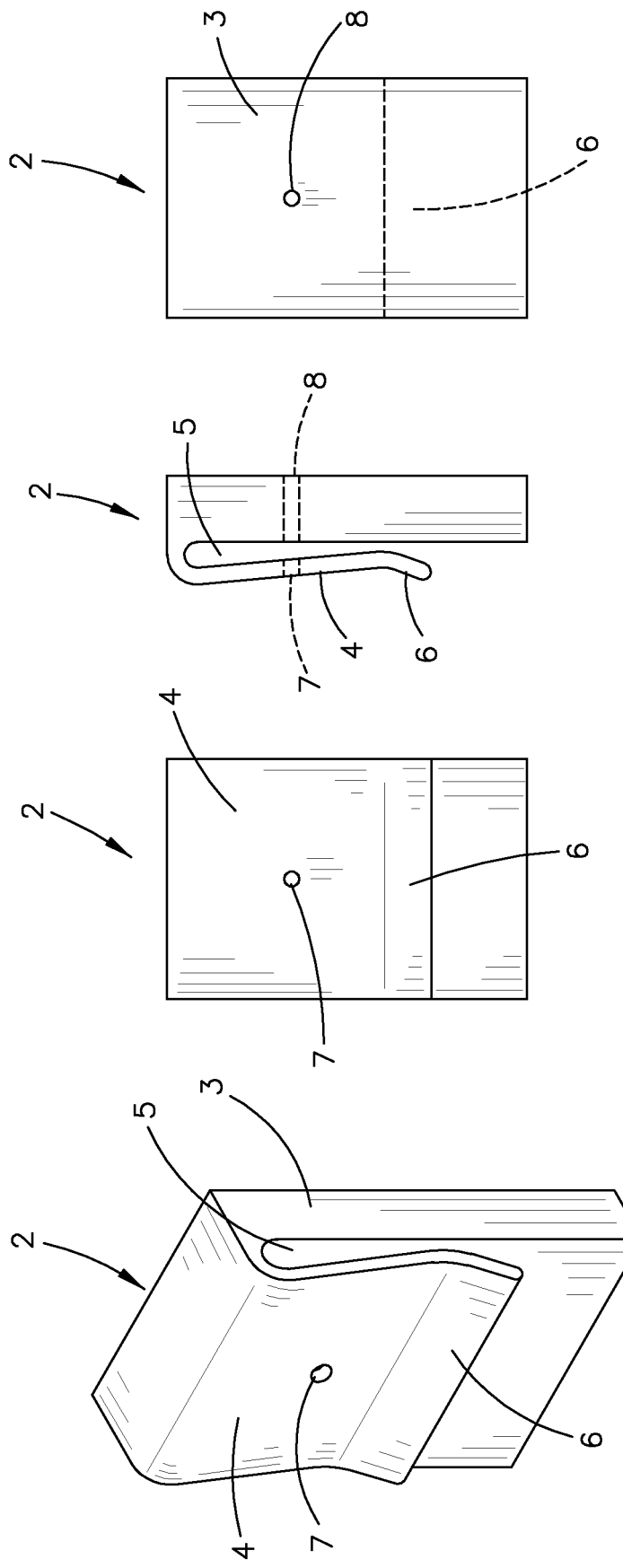

SPACER CLIP FOR USE IN A WALL ASSEMBLY

BACKGROUND OF THE INVENTION

Field of the Invention

The instant invention relates to a spacer clip which is used in the construction of a wall assembly. More particularly, the spacer clips are attached to Z girts mounted on studs to create a thermal break between the Z girts and the outer sides of sheathing members and the inner sides of insulation members. Even more particularly, the spacer clip of this invention may be used in combination with the retainer clips of U.S. Pat. No. 10,612,574 B1.

Description of the Related Art

During the construction of a wall, vertically disposed and horizontally spaced-apart studs are secured to a bottom plate and a top plate and extend therebetween. Sheathing is secured to the outer side of the studs and a weather barrier is placed over the exterior of the sheathing. Elongated and horizontally disposed Z girts are mounted on the outer sides of the sheathing members and then secured to the studs in a vertically spaced-apart manner. Insulation is then positioned between the Z girts. The problem arises as to how to retain the insulation in place in the Z girts until exterior cladding is placed on the exterior of the wall. The retainer clips disclosed in U.S. Pat. No. 10,612,574 B1 solved the problem of retaining the insulation in place until exterior cladding is placed on the exterior of the wall. The instant invention is designed to be used in combination with applicants' clips disclosed in U.S. Pat. No. 10,612,574 B1, the disclosure of which is incorporated herein by reference thereto to complete this disclosure if necessary. Since the instant invention is suited for use in the wall assemblies disclosed therein, a large portion of U.S. Pat. No. 10,612,574 B1 will be repeated herein with certain changes thereto.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A spacer clip is provided for attachment to Z girts which are attached to sheathing members secured to the outer side of horizontally spaced-apart studs. The spacer clips of this invention are attached to the Z girts to create a thermal break between the Z girts and the sheathing members. The spacer clips also provide a thermal break between the inner sides of insulation members and the outer sides of the sheathing members.

The spacer clip of this invention is comprised of a square-shaped or rectangular-shaped body member having an upper end, a lower end, a first end, a second end, a front side and a back side. A spring clip portion extends downwardly and inwardly from the upper end of the body member towards the lower end of the body member. The spacer clip of this invention is comprised of a nylon or plastic material which is comprised of a low thermal conductive material. The spacer clip is attached to the Z girts so that the body member of the spacer clip is positioned between the Z girt and the sheathing members to create a thermal break between the Z girt and the sheathing members and to provide a thermal break between the inner sides of insulation members and the outer sides of the sheathing members.

A principal object of the invention is to provide a spacer clip which may be attached to Z girts in a wall assembly to create a thermal break between the Z girts and the sheathing members and to provide a thermal break between the inner sides of insulation members and the sheathing members.

A further object of the invention is to provide a spacer clip which may be used in wall assemblies wherein the retainer clips of U.S. Pat. No. 10,612,574 B1 are utilized.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a perspective view of the insulating retainer clip of U.S. Pat. No. 10,612,574 B1;

FIG. 2 is a back view of the clip of FIG. 1;

FIG. 3 is a side view of the clip of FIG. 1;

FIG. 4 is a front view of the clip of FIG. 1;

FIG. 5 is a perspective view of the spacer clip of this invention;

FIG. 6 is a back view of the spacer clip of FIG. 5;

FIG. 7 is a side view of the spacer clip of FIG. 5;

FIG. 8 is a front view of the spacer clip of FIG. 5;

DESCRIPTION OF THE PREFERRED EMBODIMENT

Figure 9:
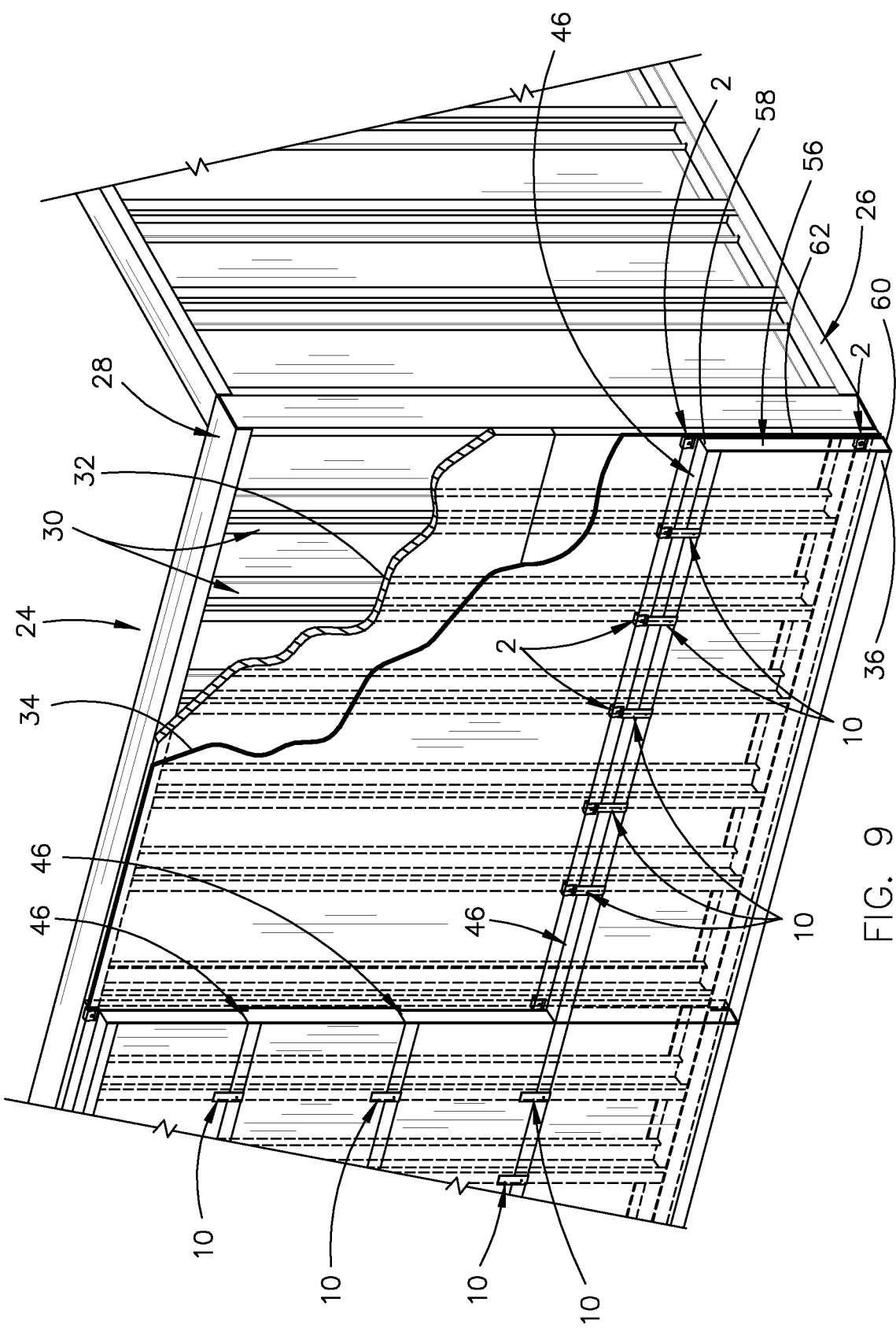
FIG. 9 is a partial view of a wall assembly under construction which employs the clip of FIGS. 1-4 and the spacer clips of this invention.
Figure 10:
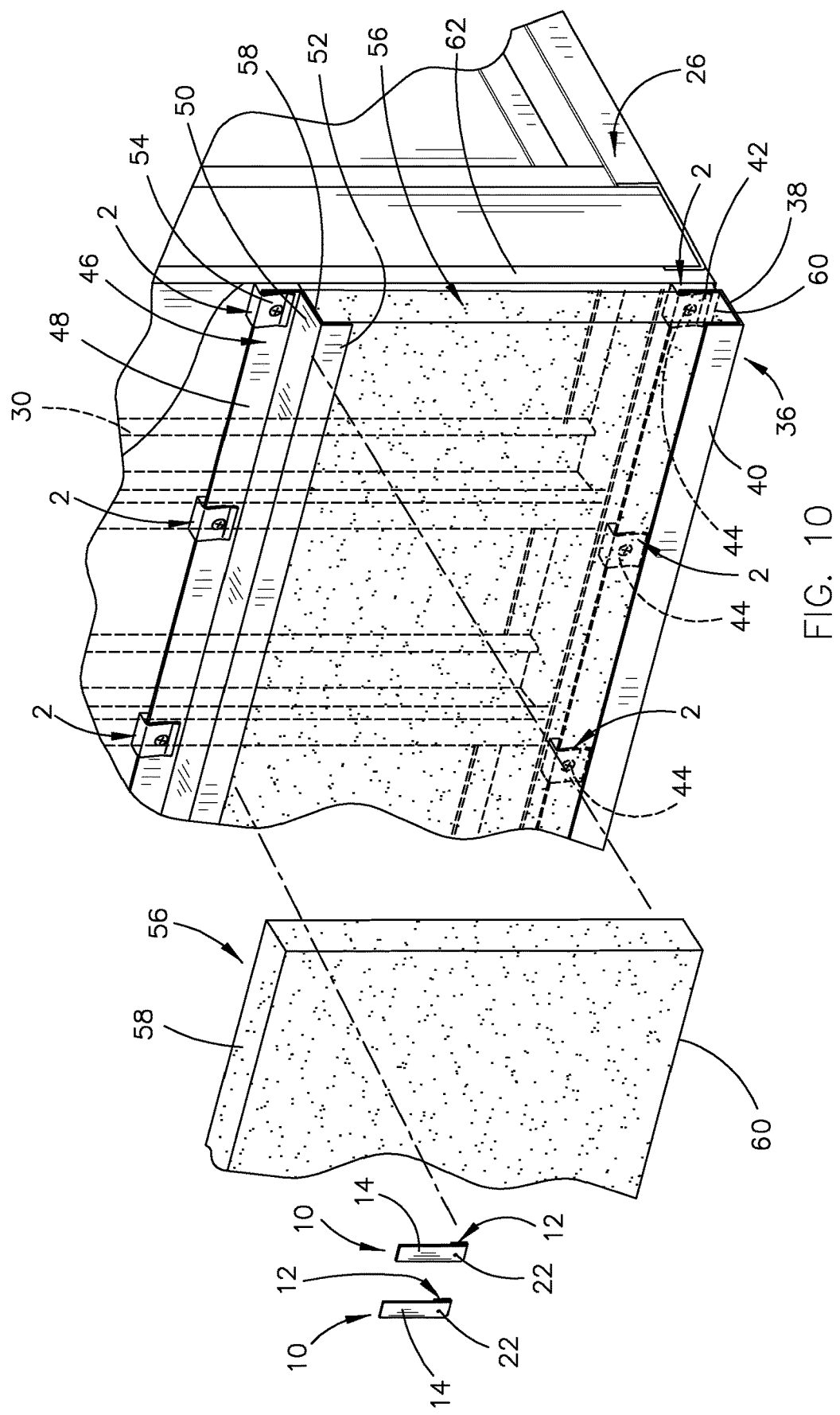
FIG. 10 is a partial exploded perspective view of a pair of clips of FIG. 1, and a plurality of the spacer clips of this invention and the manner in which they are used.
Figure 11:
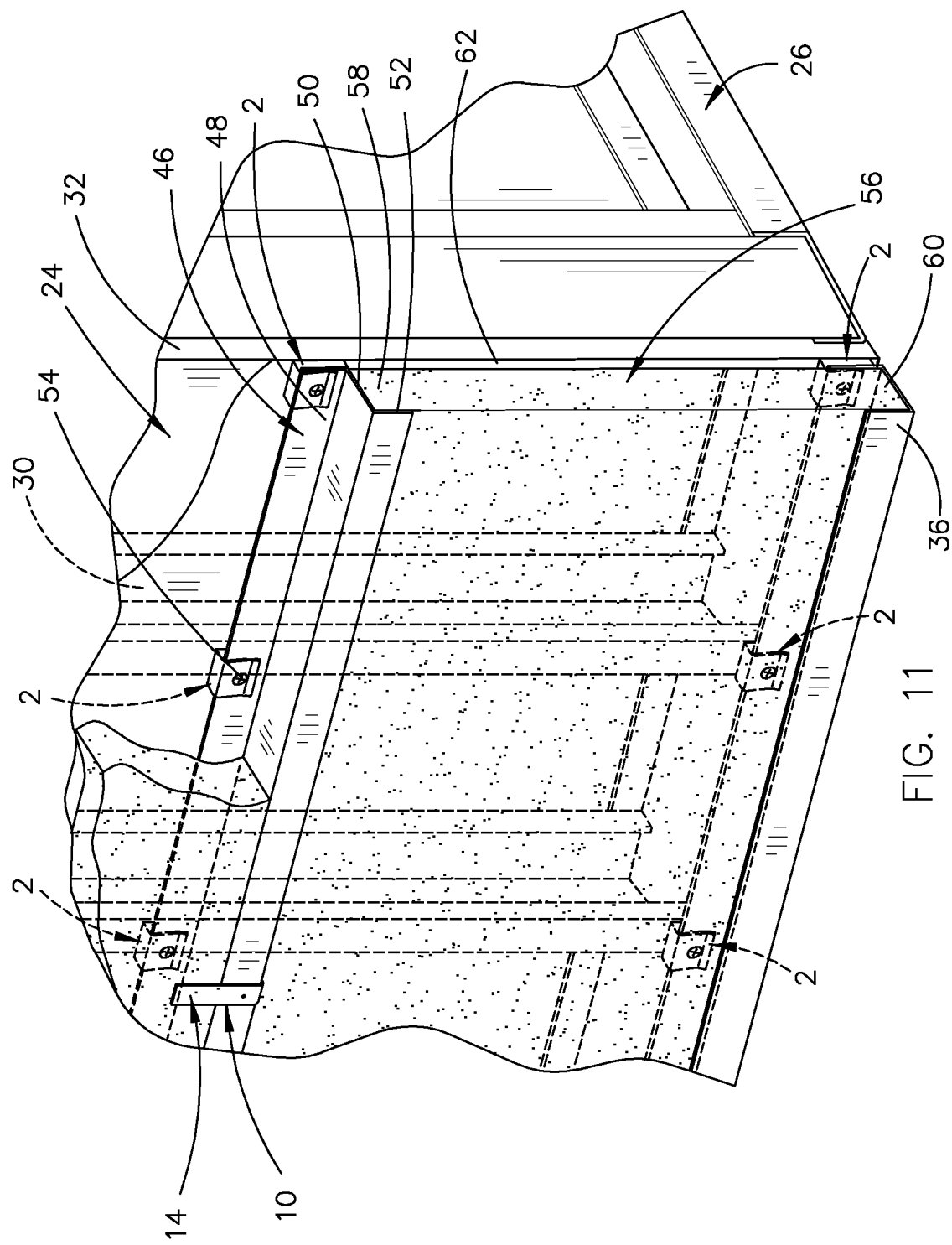
FIG. 11 is a partial perspective view illustrating the spacer clips of this invention being used to create a thermal break between a Z girt and the sheathing members.
Figure 12:
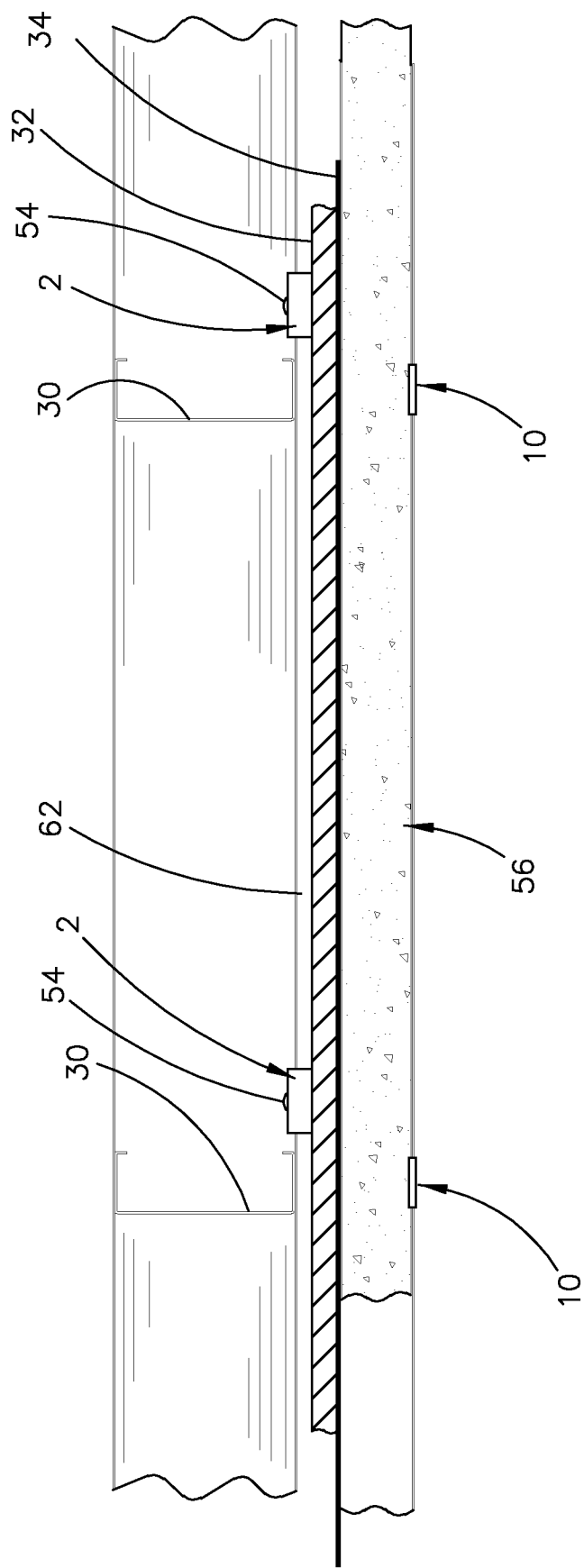
FIG. 12 is a partial sectional view illustrating a pair of spacer clips being used to create a thermal break between the Z girts and the sheathing members.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The spacer clip of this invention is designated by the reference numeral 2. Spacer clip 2 includes a square or rectangular body portion 3. A spring clip 4 extends from one end of body portion 3 at one side thereof to form an opening 5 therebetween. The spring clip 4 preferably includes a flange 6 extending outwardly therefrom. Spring clip 4 has an opening 7 formed therein. Body portion 3 has an opening 8 formed therein which registers with opening 7. Spacer clip 2 is comprised of a low thermal conductive material such as nylon, a polyamide material or polyurethane plastic material.

The clip of U.S. Pat. No. 10,612,574 B1 is referred to by the reference numeral 10. Clip 10 is formed of steel or aluminum. Clip 10 includes a clip attachment 12 and a long leg or blade 14 having an end 16. Clip attachment 12 has an end 16. Clip attachment 12 and leg 14 define a space 18 therebetween. An optional screw opening 20 is formed in clip attachment 12. As seen in FIGS. 1 and 3, the end 13 of clip attachment 12 is spaced from leg 14. As seen in FIG. 4, leg 14 has an optional screw opening 22 formed therein which registers with screw opening 20.

FIG. 9 illustrates a wall 24 under construction. Wall 24 includes a bottom or base plate 26, a top plate 28 and a plurality of studs 30 which extend vertically between plates 26 and 28 in a horizontally spaced-apart manner. The plates 26, 28 and studs 30 may be comprised of steel, aluminum or wood. The numeral 32 refers to conventional sheathing which is positioned at the outer sides of the studs 30 and which is secured thereto in conventional fashion. Sheathing 32 may be comprised of plywood, gypsum, etc. A conventional weather barrier 34 is positioned at the outer or exterior side of the sheathing 32 in conventional fashion. In some installations, the weather barrier 34 may not be required. An elongated and generally U-shaped channel 36 which includes a base portion 38, an upstanding inner wall 40 and an upstanding outer wall 42 which is positioned outwardly of bottom plate 26.

Figure 13:
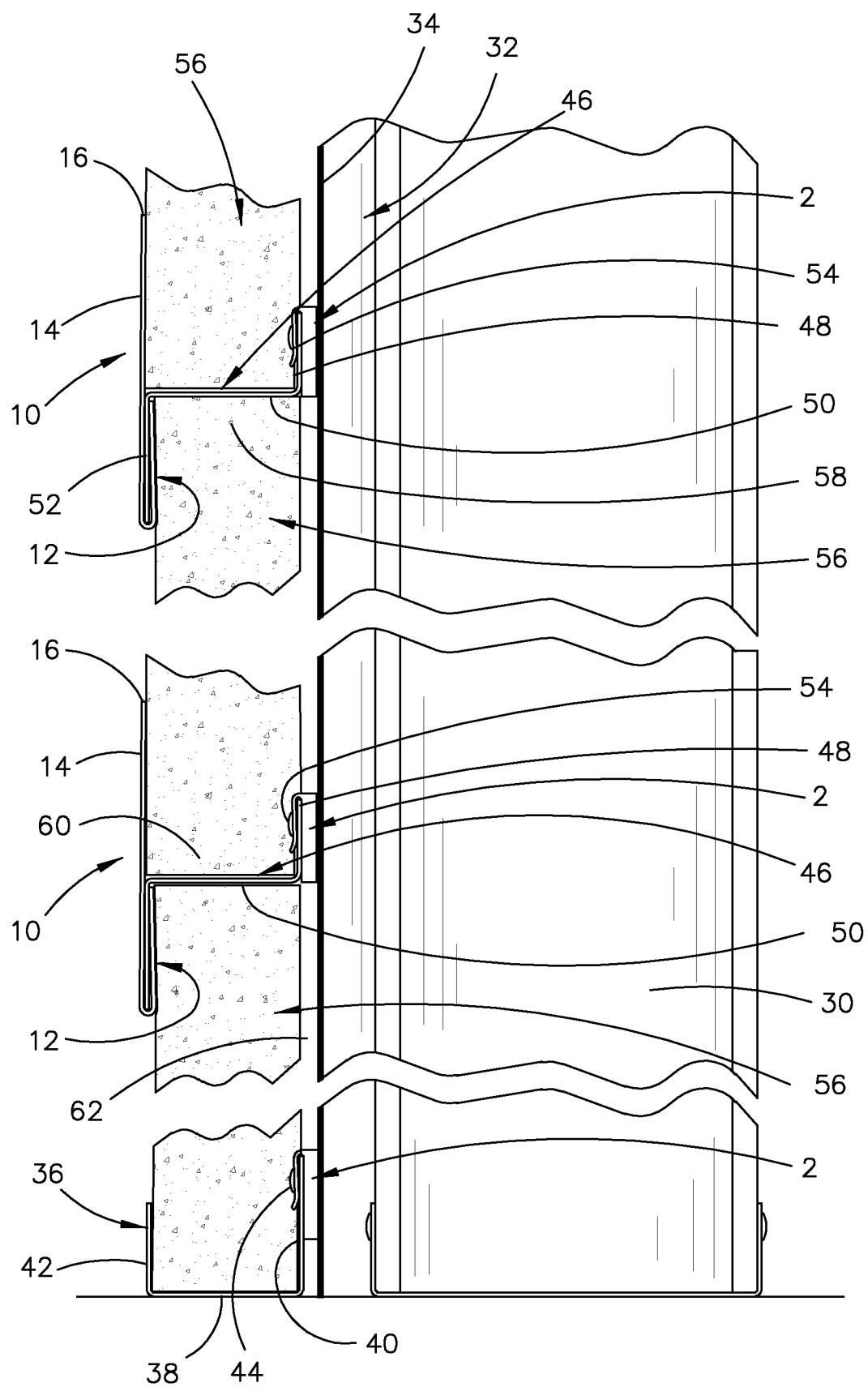
FIG. 13 is a partial side view illustrating a pair of spacer clips of this invention creating a thermal break between the Z girts and the sheathing members.
Figure 14:
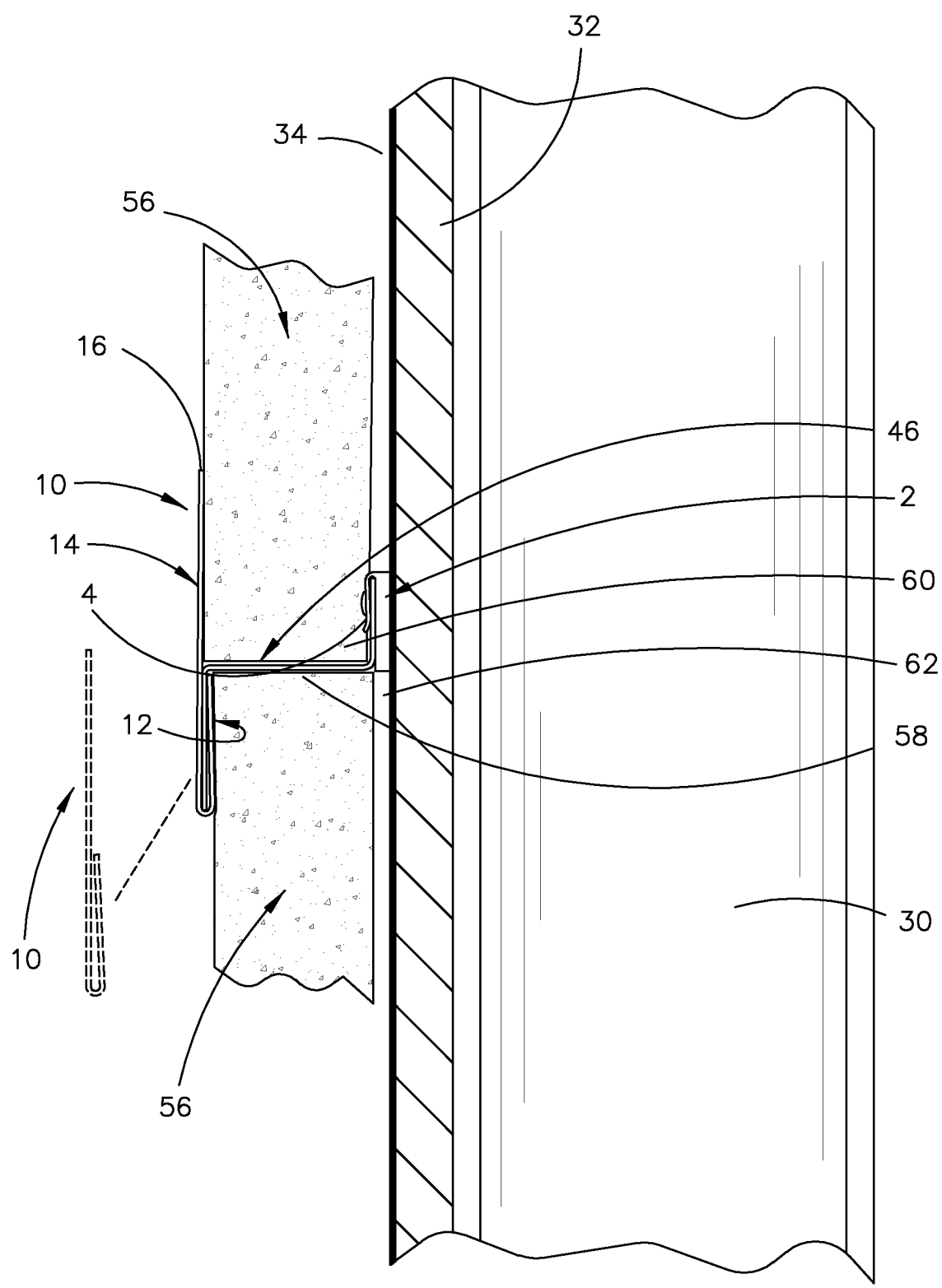
FIG. 14 is a partial side view similar to FIG. 13 which illustrate the manner in which the spacer clip of this invention is mounted on a Z girt.

A plurality of spacer clips 2 are secured to the inner wall 42 of channel 36 as seen in FIG. 13 so that the body portions 3 of spacer clips 2 are positioned between the inner wall 42 of channel 36 and the weather barrier 34, if used, and the exterior side of sheathing 32. A screw 44 extends through the opening 7 of spring clip 4, through the inner wall 40, through the opening 8 in body portion 3, through the sheathing 32 and into stud 30.

A plurality of elongated and horizontally disposed Z girts 46, which are comprised of steel or aluminum, are normally secured to the studs 30 in a vertically spaced-apart manner above the channel 36. Each of the Z girts 46 have a vertically disposed upper portion 48, a horizontally disposed wall portion 50 extending outwardly from the lower end of upper portion 48 and a vertically disposed outer wall 52 extending downwardly from the outer end of wall portion 50. The Z girts 46 are normally secured to the studs 30 by screws 54. However, as will be described hereinafter, the spacer clips 2 are mounted on the upper portions 48 of the Z girts 46 so that the body portions 3 of spacer clips 2 are positioned between the upper portions 48 of the Z girts 46 and the outer sides of sheathing 32. Each of the spacer clips 2 and the Z girts 46 are secured to sheathing 32 and the studs 30 by a screw 54 which extends through opening 7 in spring clip 4, through the Z girt 46, through opening 8 in body portion 3, through the sheathing 32 and into a stud 30.

In FIGS. 9-15, the numeral 56 refers to insulation sheets which are vertically disposed and which have an upper end 58 and a lower end 60. The insulation sheets 56, which have any length, are positioned at the outer side of the weather barrier 34 in a vertically disposed manner and in an end-to-end manner. Although the specification states that insulation sheets are positioned in an end-to-end manner in the rows, a single insulation sheet could be substituted for the plurality of insulation sheets in a particular row of insulation. The lowermost row of insulation sheets 56 have their lower ends 60 received in channel 36. Normally, the upper ends 58 of the lowermost insulation sheets 56 will be in a vertical position before a Z girt 46 is secured to the studs 30 at the upper ends 58 of insulation sheets 56. When the upper ends 58 of the lowermost insulation sheets 56 are in position, a Z girt 46, which is the lowermost Z girt 46, will be secured to the studs 30 so that the outer wall 52 of the Z girt 46 will be positioned outwardly of the upper ends 58 of the insulation sheets 56 as seen in FIG. 6. A plurality of Z girts 46 will then be secured to the studs 30 in a horizontally disposed and vertically spaced-apart manner above the lowermost Z girt 46.

The next row of insulation sheets 56 above the lowermost row of insulation sheets 56 have their upper ends 58 thereof received between the inner surface of the outer wall 52 of the Z girt 46 thereof and below the wall portion 50 thereof. The lower ends 60 of the insulation sheets 56 rest upon the wall portion 50 of the Z girt 46 therebelow. A plurality of clips 10 are then secured to the lower end of outer wall 52 as seen in FIG. 9 so that the blades 14 of the clips 10 engage the outer side of the lower end of the insulation sheets 56 to maintain the insulation sheets 56 in position. The installation process is continued as set forth above until the wall 24 is fully constructed. Once completed, cladding may be positioned at the outer sides of the insulation sheets 56 in conventional fashion.

If desired, self-tapping screws may be extended through opening 22 in blade 14 and through opening 20 in clip attachment 12. In any case, the clip attachment 12 and the blade 14 frictionally embrace the lower portion 52 of the respective Z girt 46.

The use of clips 10 in combination with the Z girts 46, maintain the insulation sheets 56 in place before materials such as cladding are placed over the insulation. The clips 10 do not interfere with materials being placed thereover.

Figure 15:
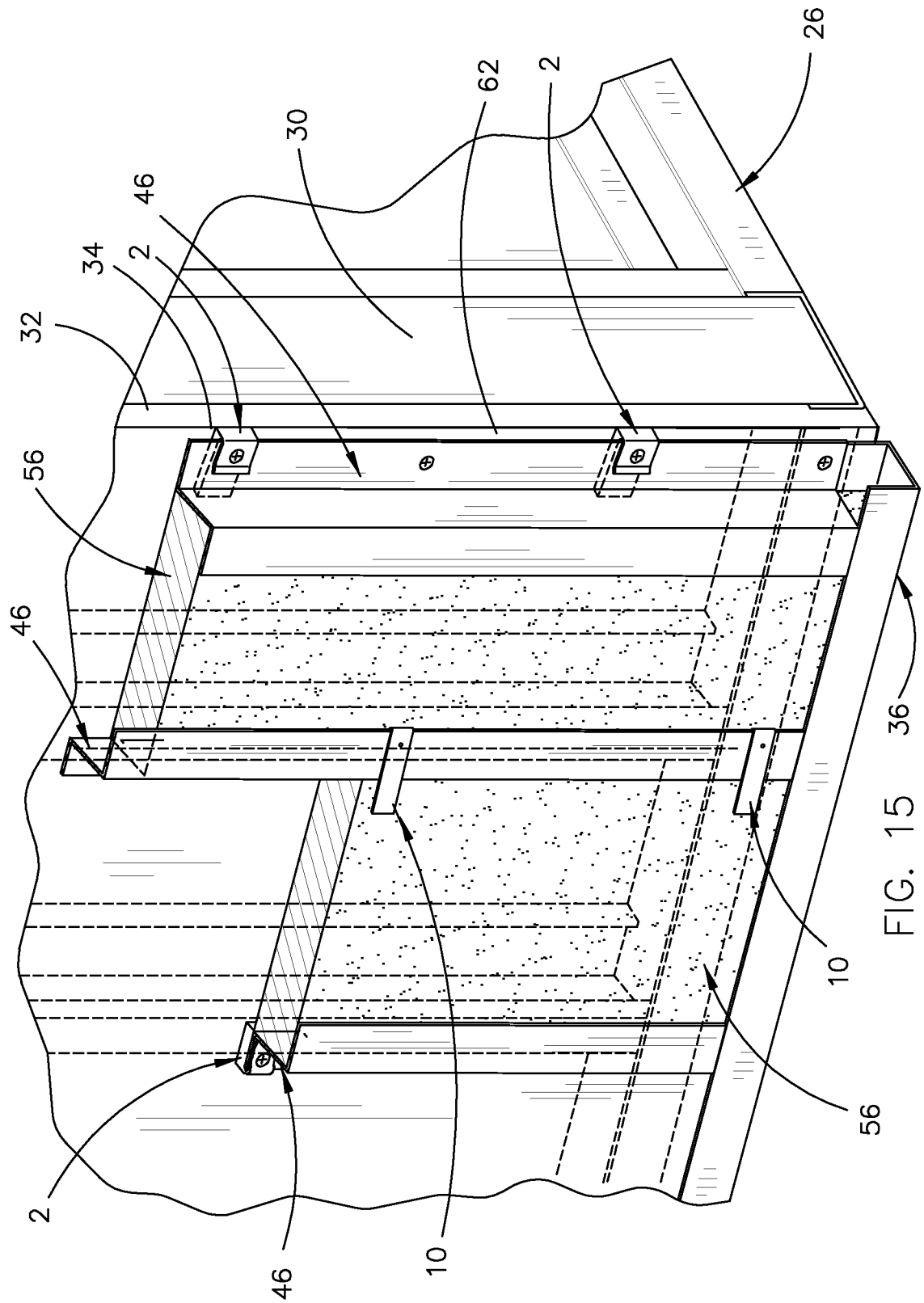
FIG. 15 is a partial side view of the spacer clip of this invention mounted on a Z girt wherein the sheathing members are vertically disposed.

FIG. 15 is a partial perspective view of a wall system of U.S. Pat. No. 10,612,574 B1 wherein the Z girts 46 are vertically disposed and horizontally spaced-apart and wherein the insulation sheets 56 are vertically disposed. In FIG. 15, the right-hand Z girt 46 would be installed first on a stud 30. An insulation sheet 56 would be positioned so that one side, or end, would be positioned with respect to the right-hand Z girt 46. After the insulation sheets 56 are so positioned, the Z girt 46 to the left of the right-hand Z girt would be attached to a stud 30.

A second Z girt 46 would then be secured to a stud 30 to the left of the first Z girt 46. The left side or end of a second insulation sheet 36 would be positioned in the second Z girt 46 as seen in FIG. 15. Clips 10 would then be secured to first Z girt 46 as illustrated in FIG. 15 so the blades of the clips 10 extend over the free end of the second insulation sheet 56 to maintain the second insulation sheet 56 in place. The proceeding is repeated until the outer side of the wall is covered by insulation.

FIG. 15 illustrates a wall assembly wherein the insulation sheets 56 are vertically disposed and the Z girts 46 are vertically disposed. In that construction, the spacer clips 2 are still secured to the portion 48 of the Z girts to create a thermal break but those portions 48 are vertically disposed.

The use of clips 10 of U.S. Pat. No. 10,612,574 B1 in the wall assembly provide an improved wall assembly. The spacer clips 2 of this invention will be used to provide a thermal break 62 between the inner sides of the Z girts 46 and the outer sides of the sheathing 32 or weather barrier 34 which is the purpose of the instant invention.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A wall assembly, comprising:
a horizontally disposed bottom plate;
a horizontally disposed top plate;
a plurality of vertically disposed studs secured to said bottom and top plates in a horizontally spaced-apart manner;
each of said studs having an interior side and an exterior side;
sheathing material secured to said exterior sides of said studs;
said sheathing material having an interior side and an exterior side;
an elongated and generally U-shaped channel member positioned outwardly of said exterior side of said sheathing material and outwardly of said bottom plate;
said channel member being secured to said bottom plate;
an elongated and horizontally disposed first Z girt being positioned outwardly of said sheathing material;
said first Z girt being positioned above said U-shaped channel member;
said first Z girt, including a vertically disposed upper portion having upper and lower ends, a horizontally disposed wall portion, having inner and outer ends, extending outwardly from said lower end of said upper portion and a vertically disposed outer wall portion, having upper and lower ends, extending downwardly from said outer end of said horizontally disposed wall portion;
a plurality of vertically disposed first insulation sheets having an upper end and a lower end;
said first insulation sheets being positioned at said exterior side of said sheathing material in an end-to-end manner;
said lower ends of said first insulation sheets being received in said channel member;
said upper ends of said first insulation sheets being received in said first Z girt inwardly of said outer wall portion thereof;
an elongated and horizontally disposed second Z girt, identical to said first Z girt, positioned above said first Z girt;
a plurality of second insulation sheets, having upper and lower ends;
said lower ends of said second insulation sheet members being positioned on said horizontally disposed wall portion of said first Z girt;
said upper ends of said second insulation sheet members being received by said second Z girt inwardly of said outer wall of said second Z girt;
a plurality of spacer clips;
each of said spacer clips including:
(a) a body member having an upper end, a lower end, a first end, a second end, an inner side and an outer side;
(b) a spring clip having an upper end, a lower end, an inner side and an outer side; and
(c) said spring clip extending downwardly from said upper end of said body portion at outer side thereof thereby creating a space therebetween;
(d) said spring clip having an opening formed therein between said upper and lower ends thereof;
(e) said body portion having an opening formed therein which is aligned with said opening in said spring clip;
said spacer clips being comprised of a low thermal conductive material;
each of said spacer clips being configured to receive said upper portion of a Z girt whereby said body portion thereof is positioned inwardly of the respective Z girt;
each of said spacer clips having a screw extending inwardly through said opening in said spring clip, through said upper portion of the respective Z girt, through said opening in said body portion thereof, through said sheathing material and into the respective stud; and
said spacer clips creating a thermal break between said Z girts and said sheathing material.

2. The wall assembly of claim 1 wherein a weather barrier is secured to said exterior side of said sheathing material.

3. The wall assembly of claim 1 wherein a plurality of insulation retainer clips are secured to said outer wall of said first Z girt which extends upwardly therefrom outwardly of said lower ends of said second insulation sheet members to maintain said second insulation sheet members in position before materials are placed over said first and second insulation sheet members.

4. A wall assembly, comprising:
a horizontally disposed bottom plate;
a horizontally disposed top plate;
a plurality of vertically disposed studs secured to said bottom and top plates in a horizontally spaced-apart manner;
said studs having upper and lower ends;
each of said studs having an interior side and an exterior side;
sheathing material secured to said exterior sides of said studs;
said sheathing material having an interior side and an exterior side;
an elongated and horizontally disposed first Z girt secured to said studs above said lower ends thereof;
an elongated and horizontally disposed second Z girt secured to said studs above said first Z girt;
an elongated and horizontally disposed third Z girt secured to said studs above said second Z girt;
an elongated and horizontally disposed fourth Z girt secured to said studs above said third Z girt;
an elongated and horizontally disposed fifth Z girt secured to said studs above said fourth Z girt;
each of said first, second, third, fourth and fifth Z girts including a vertically disposed upper portion, having upper and lower ends, a horizontally disposed wall portion, having inner and outer ends, which extends outwardly from said lower end of said upper portion thereof and a vertically disposed outer wall portion, having upper and lower ends, which extends downwardly from said outer end of said horizontally disposed wall portion;

a plurality of vertically disposed first insulation sheets having an upper end and a lower end;

said first insulation sheets being positioned at said exterior side of said weather barrier in an end-to-end manner;

said upper ends of said first insulation sheets being received in said first Z girt inwardly of said outer wall portion thereof;

a plurality of second insulation sheets, having upper and lower ends;

said lower ends of said second insulation sheet members being positioned on said horizontally disposed wall portion of said first Z girt;

said upper ends of said second insulation sheet members being received by said second Z girt inwardly of said outer wall of said second Z girt;

a plurality of third insulation sheets, having upper and lower ends;

said lower ends of said third insulation sheets being positioned on said horizontally disposed wall portion of said second Z girt;

said upper ends of said third insulation sheets being received by said third Z girt inwardly of said outer wall portion thereof;

a plurality of fourth insulation sheets, having upper and lower ends;

said lower ends of said fourth insulation sheets being positioned on said horizontally disposed wall portion of said third Z girt;

said upper ends of said fourth insulation sheets being received by said fourth Z girt inwardly of said outer wall portion thereof;

a plurality of fifth insulation sheets, having upper and lower ends;

said lower ends of said fifth insulation sheets being positioned on said horizontally disposed wall portion of said fourth Z girt;

said upper ends of said fifth insulation sheets being received by said fifth Z girt inwardly of said outer wall portion thereof;

a plurality of spacer clips;

each of said spacer clips including:
(a) a body member having an upper end, a lower end, a first end, a second end, an inner side and an outer side;
(b) a spring clip having an upper end, a lower end, an inner side and an outer side; and
(c) said spring clip extending downwardly from said upper end of said body portion at outer side thereof thereby creating a space therebetween;
(d) said spring clip having an opening formed therein between said upper and lower ends thereof;
(e) said body portion having an opening formed therein which is aligned with said opening in said spring clip;

said spacer clips being comprised of a low thermal conductive material;

each of said spacer clips being configured to receive said upper portion of a Z girt whereby said body portion thereof is positioned inwardly of the respective Z girt;

each of said spacer clips having a screw extending inwardly through said opening in said spring clip, through said upper portion of the respective Z girt, through said opening in said body portion thereof, through said sheathing material and into the respective stud; and said spacer clips creating a thermal break between Z girts and said sheathing material.

5. The wall assembly of claim 4 wherein a plurality of insulation retainer clips are secured to said outer wall portion of said first Z girt which extend upwardly therefrom outwardly of said lower ends of said second insulation sheets to retain said second insulation sheets in position and wherein a plurality of insulation retainer clips are secured to said outer wall portion of said second Z girt which extend upwardly therefrom outwardly of said lower ends of said third insulation sheets to retain said third insulation sheets in position and wherein a plurality of insulation retainer clips are secured to said outer wall portion of said third Z girt which extend upwardly therefrom outwardly of said lower ends of said fourth insulation sheets to retain said fourth insulation sheets in position and wherein a plurality of insulation retainer clips are secured to said outer wall portion of said fourth Z girt which extend upwardly therefrom outwardly of said lower ends of said fifth insulation sheets to retain said fifth insulation sheets in position.

6. A wall assembly, comprising:
a horizontally disposed bottom plate;
a horizontally disposed top plate;
a plurality of vertically disposed studs secured to said bottom and top plates in a horizontally spaced-apart manner;
each of said studs having an interior side and an exterior side;
sheathing material secured to said exterior sides of said studs;
said sheathing material having an interior side and an exterior side;
a plurality of vertically disposed and elongated Z girts positioned outwardly of said exterior side of said sheathing and being secured to said studs so as to be horizontally spaced-apart;
a plurality of spacer clips;
each of said spacer clips including:
(a) a body member having an upper end, a lower end, a first end, a second end, an inner side and an outer side;
(b) a spring clip having an upper end, a lower end, an inner side and an outer side; and
(c) said spring clip extending downwardly from said upper end of said body portion at outer side thereof thereby creating a space therebetween;
(d) said spring clip having an opening formed therein between said upper and lower ends thereof;
(e) said body portion having an opening formed therein which is aligned with said opening in said spring clip;

said spacer clips being comprised of a low thermal conductive material;

each of said spacer clips being configured to receive a portion of a Z girt whereby said body portion thereof is positioned inwardly of the respective Z girt;

each of said spacer clips having a screw extending inwardly through said opening in said spring clip, through said portion of the respective Z girt, through said opening in said body portion thereof, through said sheathing material and into the respective stud; and said spacer clips creating a thermal break between said Z girts and said sheathing material.

7. A wall assembly, comprising:

a horizontally disposed bottom plate;

a horizontally disposed top plate;

a plurality of vertically disposed studs secured to said bottom and top plates in a horizontally spaced-apart manner;

each of said studs having an interior side and an exterior side;

sheathing material secured to said exterior sides of said studs;

said sheathing material having an interior side and an exterior side;

a weather barrier secured to said exterior side of said sheathing material;

said weather barrier having an interior side and an exterior side;

an elongated and generally U-shaped channel member positioned outwardly of said exterior side of said weather barrier and outwardly of said bottom plate;

said channel member being secured to said bottom plate;

a plurality of vertically disposed and elongated Z girts positioned outwardly of said exterior side of said sheathing material and being secured to said studs so as to be horizontally spaced-apart and positioned above said bottom plate;

a plurality of vertically disposed insulation sheets having an upper end, a lower end, a first side and a second side;

said insulation sheets being positioned at said exterior side of said weather barrier in a horizontally spaced-apart manner;

the lower end of the lowermost insulation sheets being received in said channel member;

the first side of the lowermost insulation sheets being received in a Z girt;

the second side of the lowermost insulation sheets being received in a Z girt;

a plurality of insulation retainer clips secured to some of said Z girts to maintain said insulation sheets in position before materials are placed over said insulation sheets;

a plurality of spacer clips;

each of said spacer clips including:
    (a) a body member having an upper end, a lower end, a first end, a second end, an inner side and an outer side;
    (b) a spring clip having an upper end, a lower end, an inner side and an outer side; and
    (c) said spring clip extending downwardly from said upper end of said body portion at outer side thereof thereby creating a space therebetween;
    (d) said spring clip having an opening formed therein between said upper and lower ends thereof;
    (e) said body portion having an opening formed therein which is aligned with said opening in said spring clip;

said spacer clips being comprised of a low thermal conductive material;

each of said spacer clips being configured to receive a portion of a Z girt whereby said body portion thereof is positioned inwardly of the respective Z girt;

each of said spacer clips having a screw extending inwardly through said opening in said spring clip, through said portion of the respective Z girt, through said opening in said body portion thereof, through said sheathing material and into the respective stud; and said spacer clips creating a thermal break between said Z girts and said sheathing material.

* * * * *